United States Patent
Kawabe et al.

(10) Patent No.: US 9,353,697 B2
(45) Date of Patent: May 31, 2016

(54) CONTROL UNIT FOR INTERNAL COMBUSTION ENGINE

(71) Applicant: Mitsubishi Jidosha Kogyo Kabushiki Kaisha, Tokyo (JP)

(72) Inventors: Takashi Kawabe, Tokyo (JP); Fumiaki Hiraishi, Tokyo (JP); Kiyotaka Hosono, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 14/343,459

(22) PCT Filed: Oct. 23, 2012

(86) PCT No.: PCT/JP2012/077319
§ 371 (c)(1),
(2) Date: Mar. 7, 2014

(87) PCT Pub. No.: WO2013/073346
PCT Pub. Date: May 23, 2013

(65) Prior Publication Data
US 2014/0216414 A1 Aug. 7, 2014

(30) Foreign Application Priority Data

Nov. 18, 2011 (JP) .................................. 2011-253048

(51) Int. Cl.
| | |
|---|---|
| *F02D 41/30* | (2006.01) |
| *F02D 41/40* | (2006.01) |
| *F02M 69/04* | (2006.01) |
| *F02D 41/22* | (2006.01) |

(Continued)

(52) U.S. Cl.
CPC ........ *F02D 41/3094* (2013.01); *F02D 13/0203* (2013.01); *F02D 41/221* (2013.01);
(Continued)

(58) Field of Classification Search
CPC .. F01D 41/3094; F02D 41/221; F02M 69/046

USPC .......... 123/431, 432, 308, 299, 300; 701/103, 701/104, 105; 73/114.45

See application file for complete search history.

(56) References Cited

U.S. PATENT DOCUMENTS

| | | | | |
|---|---|---|---|---|
| 5,924,405 A | * | 7/1999 | Hashimoto | ........... F02D 41/062 123/295 |
| 7,124,737 B2 | * | 10/2006 | Sadakane | ............ F02D 41/3029 123/299 |

(Continued)

FOREIGN PATENT DOCUMENTS

| | | |
|---|---|---|
| CN | 1981131 A | 6/2007 |
| JP | 2005-120852 A | 5/2005 |

(Continued)

OTHER PUBLICATIONS

Japanese Office Action mailed Apr. 22, 2015 issued in corresponding Japanese Application No. 2011-253048.

*Primary Examiner* — Mahmoud Gimie
(74) *Attorney, Agent, or Firm* — Birch, Stewart, Kolasch & Birch, LLP

(57) ABSTRACT

A control unit for an internal combustion engine includes a load detector to detect a load on the engine, an injection volume calculator to calculate a cylinder injection volume indicating a volume of fuel injected from a direct injector, a first controller to perform a first control for increasing the frequency of the injection by the direct injector upon a reduction in the cylinder injection volume, a second controller to perform a second control for increasing a port injection volume indicating a volume of fuel injected from a port injector upon a reduction in the cylinder injection volume, and a switching controller to switch between the first control with the first controller and the second control with the second controller depending on the load.

6 Claims, 4 Drawing Sheets

(51) Int. Cl.
*F02D 41/34* (2006.01)
*F02D 43/04* (2006.01)
*F02D 13/02* (2006.01)
*F02D 41/04* (2006.01)

(52) U.S. Cl.
CPC ............... *F02D 41/30* (2013.01); *F02D 41/34* (2013.01); *F02D 41/402* (2013.01); *F02D 43/04* (2013.01); *F02M 69/046* (2013.01); *F02D 41/04* (2013.01); *Y02T 10/18* (2013.01); *Y02T 10/44* (2013.01)

(56) References Cited

U.S. PATENT DOCUMENTS

| | | | | |
|---|---|---|---|---|
| 7,620,488 | B2 * | 11/2009 | Kaneko | F02D 41/1475 123/299 |
| 2005/0166896 | A1 * | 8/2005 | Sadakane | F02D 41/3029 123/431 |
| 2009/0099753 | A1 * | 4/2009 | Kaneko | F02D 41/1475 701/103 |
| 2012/0247422 | A1 * | 10/2012 | Nagakura | F02D 41/1454 123/299 |
| 2012/0318053 | A1 * | 12/2012 | Ikemoto | F02D 41/221 73/114.45 |

FOREIGN PATENT DOCUMENTS

| | | |
|---|---|---|
| JP | 2005-201083 A | 7/2005 |
| JP | 2005-201113 A | 7/2005 |
| JP | 2006-336620 A | 12/2006 |
| JP | 2010-24927 A | 2/2010 |
| JP | 2010-127180 A | 6/2010 |
| JP | 2010-133351 A | 6/2010 |

\* cited by examiner

CONTROL UNIT FOR INTERNAL COMBUSTION ENGINE

FIELD

The present invention relates to a control unit for an internal combustion engine including a direct injector (cylinder injection valve, direct injection valve) directly injecting fuel into a cylinder and a port injector (port injection valve) injecting fuel into an intake port of the cylinder.

BACKGROUND

Some conventional engines (internal combustion engines) have two parallel modes of cylinder injection (direct injection (DI)) and port injection. The engines perform homogeneous combustion in the cylinder having a uniform concentration distribution of air-fuel mixture therein, and stratified combustion in the cylinder containing dense air-fuel mixture concentrated around a spark plug in a layered form.

The typical fuel injection control mainly involves the port injection during the homogeneous combustion, and the direct injection during the stratified combustion. The selection of an appropriate fuel injection mode depending on the operating state of an engine and the load thereon can improve the fuel economy while maintaining the output of the engine and combustion stability.

While a port injector is provided inside the intake port of each cylinder, direct injector is provided such that its exit protrudes into the combustion chamber of each cylinder. This may cause accumulation of deposits around the exit of the direct injector, thereby inhibiting proper direct injection. For example, the accumulated deposits may reduce the opening area of the exit to decrease the volume of direct injection, or may vary the direction or shape of fuel spray to deteriorate the combustion characteristics of air-fuel mixture.

Under such circumstances, techniques have been disclosed for removing the deposits accumulated on the direct injector by forced direct injection. For example, Patent Literature 1 discloses a control for forcibly varying the fuel injection mode to perform only direct injection even in the operation region for port injection. If a reduction is determined in the volume of fuel injection from the direct injector, this technique forces the direct injector to perform direct injection by predetermined combustion cycles, even during the port injection. This control operation can remove the deposits accumulated around the exit of the direct injector by blowing off.

RELATED ART

Patent Literature

Patent Literature 1: Japanese Patent Application Publication No. 2005-201083

SUMMARY

Technical Problems

Unfortunately, in the conventional technique as in Patent Literature 1, start of the direct injection to blow off the deposits requires the determination on a reduction in the volume of fuel injection from the direct injector. For example, the direct injection also applies to the operating state that imposes a relatively high load on the engine during the travel of the vehicle including the engine. Any deposit remaining around the exit of the direct injector may prevent the engine from maintaining the output corresponding to the magnitude of the load and achieving a stable operating state. Such direct injection is however necessary to readily remove the deposits accumulated around the exit.

The conventional technique cannot easily achieve parallel operations of the control for recovering the injectability decline in the direct injector due to the deposits and the control for preferentially maintaining the engine output, or set conditions for balancing the parallel operations.

An object of the present invention, which has been accomplished in view of the above problems, is to provide a control unit designed for an internal combustion engine with a direct injector and port injector and maintaining the engine output while restoring the injectability of the direct injector.

Another object of the present invention is to provide advantageous effects that are derived from the individual features described in the Description of Embodiment below but not from conventional techniques.

Solution to Problems (1) A control unit according to the present disclosure is designed for an internal combustion engine including a direct injector directly injecting fuel into a cylinder and a port injector injecting fuel into an intake port of the cylinder. The control unit includes a load detector to detect a load on the engine; an injection volume calculator to calculate a direct injection volume indicating a volume of the fuel injected from the direct injector; a first controller to perform a first control for increasing the frequency of the injection by the direct injector, upon a reduction in the direct injection volume; a second controller to perform a second control for increasing a port injection volume indicating a volume of the fuel injected from the port injector, upon a reduction in the direct injection volume; and a switching controller to switch between the first control with the first controller and the second control with the second controller depending on the load.

The load includes, for example, a load required of the internal combustion engine by a driver or various control units. The load also includes parameters, such as the torque, air volume, and charging efficiency, corresponding to the required load. The required load may be the running state of a turbocharger.

The first control promotes selection of a first operation region upon a reduction in the direct injection volume, thereby promoting removal of deposits accumulated around the exit of the direct injector to restore the volume of direct injection. The second control increases the volume of port injection to compensate for a decline in the volume of direct injection, thereby maintaining the output of the internal combustion engine.

(2) In a preferred embodiment, the switching controller causes the first controller to perform the first control if the load is lower than a predetermined load, and causes the second controller to perform the second control if the load is not lower than the predetermined load.

(3) In a preferred embodiment, the control unit further includes a turbocharge detector to detect a running state of a turbocharger provided in the engine. In this case, the switching controller causes the first controller to perform the first control if the turbocharger is not activated, and causes the second controller to perform the second control if the turbocharger is activated.

(4) In a preferred embodiment, the control unit further includes a selector to select a first operation region for fuel supply from the direct injector or a second operation region for fuel supply from the port injector, depending on the load.

In this case, the first control increases the frequency of selection of the first operation region by the selector, upon a reduction in the direct injection volume.

(5) In a preferred embodiment, the load detector detects the load in the form of a volume of air to enter the engine and the number of revolutions of the engine, the selector selects the first operation region or the second operation region based on the air volume and the number of revolutions, and the first controller decreases a threshold value of each of the air volume and the number of revolutions for selection of the first operation region, upon a reduction in the direct injection volume.

(6) In a preferred embodiment, the control unit further includes a port injection controller to control the port injection volume from the port injector, and an overlap period controller to control an overlap period during which both an intake valve and an exhaust valve of the cylinder are open. In this case, the second control performed by the second controller increases the port injection volume equivalent to a decrement in the direct injection volume and reduces the overlap period, upon a reduction in the direct injection volume.

Advantageous Effects

The control unit for an internal combustion engine according to the present disclosure switches between the first control and second control depending on a load on the internal combustion engine. Thereby it can be satisfied to balance the parallel operations of the control for restoring the injectability of the direct injector and the control for preferentially maintaining the engine output. This control operation can maintain the output of the internal combustion engine corresponding to the required load while keeping the injectability of the direct injector higher than that of conventional techniques.

DESCRIPTION OF EMBODIMENTS

The control unit will now be described with reference to the accompanying drawings. The embodiments below are mere examples and do not intend to exclude application of various modifications or techniques that are not described in the embodiments. The individual features of the embodiments may be variously modified within the gist, and may be selectively employed as necessary or properly combined with one another.

[1. Structure of Device]
[1-1. Engine]

Figure 1:
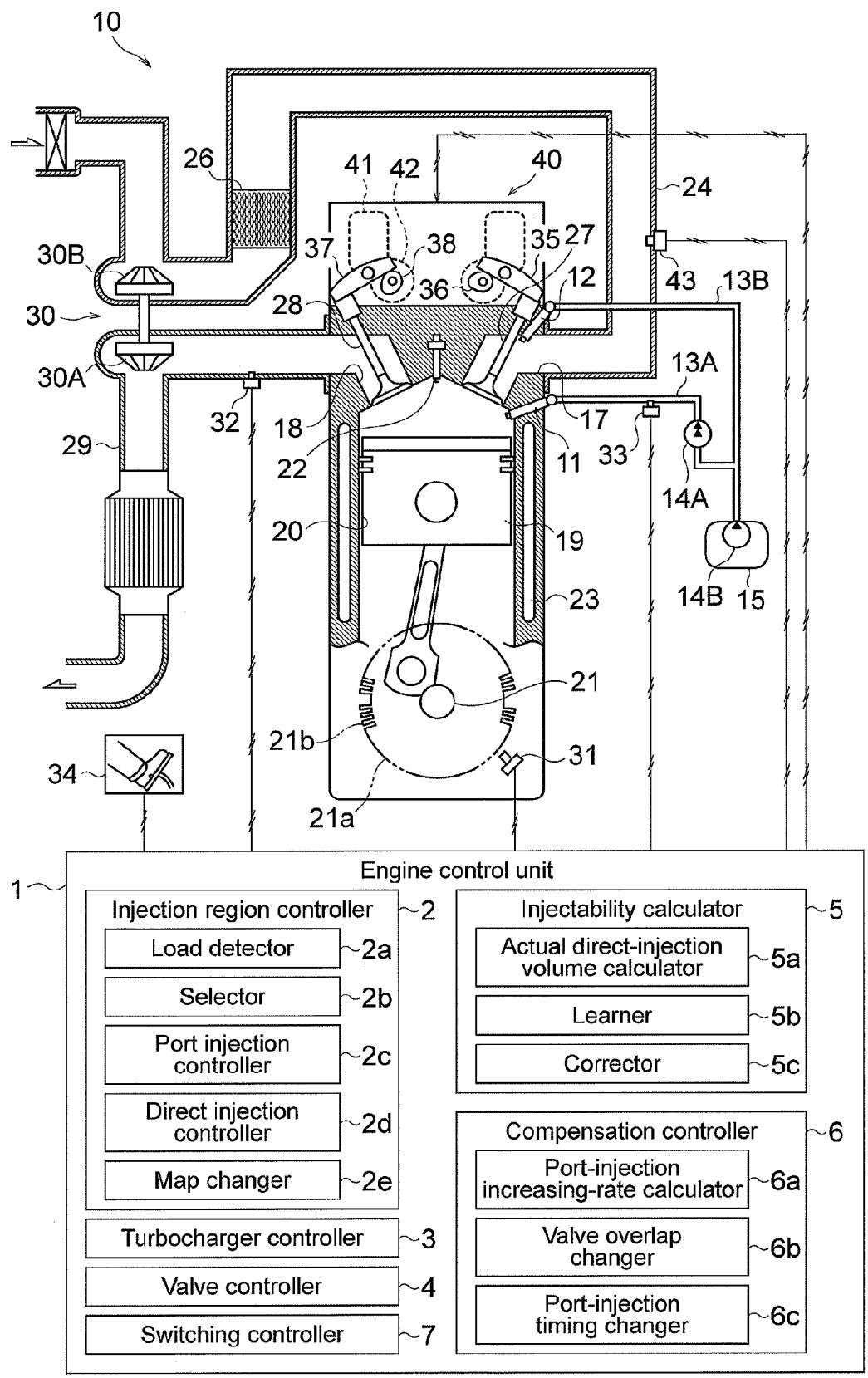
FIG. 1 is a diagram illustrating the block configuration of a control unit for an internal combustion engine according to one embodiment and the structure of an engine to which the control unit is applied.

A control unit for an internal combustion engine according to the present embodiment is applied to an in-vehicle gasoline engine 10 (hereinafter referred to as "engine 10") illustrated in FIG. 1. The figure illustrates a cylinder 20, which is one of the cylinders provided in the multi-cylinder engine 10. A piston 19 reciprocating in the cylinder 20 is connected to a crankshaft 21 via a connecting rod.

There is a water jacket 23 around the cylinder 20 for cooling water flowing therethrough. The water jacket 23 leads to a cooling water path (not shown), so that cooling water circulates in the water jacket 23 and the cooling water path.

The ceiling of the cylinder 20 is connected with an intake port 17 and an exhaust port 18. The opening of the intake port 17 adjacent to the cylinder 20 includes an intake valve 27, while the exhaust port 18 includes an exhaust valve 28. The intake valve 27 opens or closes to connect or disconnect the intake port 17 to a combustion chamber (the inside of the cylinder 20), while the exhaust valve 28 opens or closes to connect or disconnect the exhaust port 18 from the combustion chamber.

Between the intake port 17 and exhaust port 18, a spark plug 22 is mounted such that its tip protrudes into the combustion chamber. The spark plug 22 sparks off at an ignition timing controlled by an engine control unit 1 described below.

The tops of the intake valve 27 and exhaust valve 28 are respectively connected to the rocker arms 35 and 37 in a variable valve mechanism 40, and independently reciprocate in the vertical direction in response to swings of the rocker arms 35 and 37. The other ends of the rocker arms 35 and 37 are provided with cams 36 and 38 rotatably supported by camshafts. The shapes (cam profiles) of the cams 36 and 38 define the swing patterns of the rocker arms 35 and 37. The valve lifts and valve timings of the intake valve 27 and exhaust valve 28 are controlled by the engine control unit 1 via the variable valve mechanism 40.

[1-2. Fuel Injection System]

To supply fuel to the cylinder 20, a direct injector 11 (cylinder injection valve) injecting fuel directly into the cylinder 20 and a port injector 12 (port injection valve) injecting fuel into the intake port 17 are provided. The fuel from the direct injector 11 is introduced to the vicinity of the spark plug 22 by the internal laminar airflow, for example, and inhomogeneously distributed in the intake air. In contrast, the fuel from the port injector 12 is atomized in the intake port 17, and well mixed with the intake air and enters the cylinder 20.

The two injectors are also provided to each of the other cylinders (not shown) of the engine 10. The volumes and timings of the fuel injection from the direct injector 11 and port injector 12 are controlled by the engine control unit 1. For example, the engine control unit 1 transmits control pulse signals to the injector 11 or 12, which cause the exit of the injector 11 or 12 to open for a period corresponding to the magnitude of the signals. The fuel injection volume therefore reflects the magnitude of control pulse signals (driving pulse width) and the injection timing reflects the time of transmission of control pulse signals.

The direct injector 11 is connected to a high-pressure pump 14A via a high-pressure fuel path 13A, while the port injector 12 is connected to a low-pressure pump 14B via a low-pressure fuel path 13B. The direct injector 11 is supplied with fuel at a higher pressure than that of the port injector 12.

The high-pressure pump 14A and low-pressure pump 14B are mechanical pumps with variable flow rates for pumping fuel. The pumps 14A and 14B are driven by a component such as the engine 10 or a motor, and pump fuel from a fuel tank 15 into the paths 13A and 13B, respectively. The volumes and pressures of the fuel from the pumps 14A, and 14B are variably controlled by the engine control unit 1.

[1-3. Valve System]

The engine 10 includes the variable, valve mechanism 40 controlling operations of the rocker arms 35 and 37 or the cams 36 and 38. The variable valve mechanism 40 varies the maximum valve lifts and valve timings of the intake valve 27 and exhaust valve 28 independently or in cooperation with each other. The variable valve mechanism 40 includes valve lift adjusters 41 and valve timing adjusters 42 for varying the widths and timings of swings of the rocker arms 35 and 37.

The valve lift adjusters 41 continuously vary the maximum valve lifts of the intake valve 27 and exhaust valve 28, and can vary the widths of swings transferred from the cams 36 and 38 to the rocker arms 35 and 37. The valve lift adjusters 41 may have any specific structure to vary the swing widths of the rocker arms 35 and 37.

The control parameter corresponding to the valve lift is a control angle $\theta_{VVL}$. The valve lift adjusters 41 increase the valve lift as the control angle $\theta_{VVL}$ increases. The control angle $\theta_{VVL}$ is calculated by a valve controller 4 of the engine control unit 1, which will be explained below, and transmitted to the valve lift adjusters 41.

The valve timing adjusters 42 vary the timings of opening and closure (valve timings) of the intake valve 27 and exhaust valve 28, and can vary the rotational phases of the cams 36 and 38 or the camshafts, which cause the rocker arms 35 and 37 to swing. A change in the rotational phase of the cam 36 or 38 or the camshaft results in continuous shifts in swing timings of the rocker arm 35 or 37 relative to the rotational phase of the crankshaft 21.

The control parameter corresponding to the valve timing is a phase angle $\theta_{VVT}$. The phase angle $\theta_{VVT}$ indicates how much the phase of the cam 36 or 38 gets advanced or retarded relative to the reference phase of the camshaft. The phase angle $\theta_{VVT}$ corresponds to the opening timing and closing timing of the intake valve 27 or exhaust valve 28, respectively. The phase angle $\theta_{VVT}$ is calculated by the valve controller 4 of the engine control unit 1 and transmitted to the valve timing adjusters 42. The valve timing adjusters 42 properly control the valve timings by adjusting the phase angles $\theta_{VVT}$ of the cams 36 and 38.

[1-4. Intake and Exhaust System]

The intake and exhaust system of the engine 10 further includes a turbocharger 30 turbocharging the cylinder 20 with intake air by the action of the exhaust pressure. The turbocharger 30 is mounted across both the intake path 24 connected to the upstream side of the intake port 17 and the exhaust path 29 connected to the downstream side of the exhaust port 18.

The turbocharger 30 includes a turbine 30A and a compressor 30B. The turbine 30A rotates by the action of the exhaust pressure in the exhaust path 29 and transmits the rotation to the compressor 30B in the intake path 24. The compressor 30B compresses the intake air in the intake path 24 toward the downstream and turbocharges the engine 10. The intake path 24 includes an intercooler 26 at the downstream side of the compressor 30B for cooling the compressed air. The engine control unit 1 controls the turbocharging operation by the turbocharger 30.

[1-5. Detection System]

The crankshaft 21 includes a crank disk 21a provided coaxially with the rotational axis of the crankshaft 21, and a crank angle sensor 31 detecting the rotation angle of the crank disk 21a, at one end of the crankshaft 21. The edge of the crank disk 21a has irregularities 21b, for example. The crank angle sensor 31, which is fixed near the edge of the crank disk 21a, detects the profile of the irregularities 21b of the crank disk 21a and outputs crank pulse signals. The output crank pulse signals are transmitted to the engine control unit 1.

As the rotational rate of the crankshaft 21 increases, the period of the crank pulse signals output from the crank angle sensor 31 decreases. The time density of the crank pulse signals reflects the actual number Ne of revolutions of the engine (rotational frequency of the engine, engine speed) and an angular velocity of the crankshaft 21. Thus, the crank angle sensor 31 detects the number Ne of engine revolutions, the crank angle, and the angular velocity.

The exhaust path 29 includes an oxygen level sensor 32 at any location for measuring an oxygen level in the exhaust air. The information on the detected oxygen level is transmitted to the engine control unit 1.

The intake path 24 includes an airflow sensor 43 detecting the airflow rate. The information on the detected airflow rate, which corresponds to the volume of intake air to enter the cylinder 20, is transmitted to the engine control unit 1.

The high-pressure fuel path 13A includes a fuel pressure sensor 33 detecting a pressure of fuel to enter the direct injector 11. The information on the detected fuel pressure is also transmitted to the engine control unit 1.

The vehicle includes an accelerator pedal sensor 34 at any location for detecting a manipulated variable corresponding to a pressing depth on the accelerator pedal. The manipulated variable on pressing on the accelerator pedal reflects a driver's request for acceleration, that is, an output request to the engine 10. The information on the detected manipulated variable is transmitted to the engine control unit 1.

[1-6. Control System]

The engine control unit 1 (engine ECU) is an electronic control unit including, for example, an LSI device (Large Scale Integrated circuit) or an embedded electronic device into which a microprocessor, a ROM (Read Only Memory), and a RAM (Random Access Memory) are integrated. The engine control unit 1 is connected with other electronic control units, the variable valve mechanism 40, and several sensors such as the crank angle sensor 31, the oxygen level sensor 32, the fuel pressure sensor 33, the accelerator pedal sensor 34, and the airflow sensor 43 via their dedicated communication lines or an in-vehicle communication network.

The engine control unit 1 controls various systems for the engine 10, such as an ignition system, a fuel injection system, an intake and exhaust system, and a valve system. Specific targets to be controlled by the engine control unit 1 include the volumes and timings of fuel injection from the direct injector 11 and port injector 12, the ignition timing of the spark plug 22, the valve lifts and valve timings of the intake valve 27 and exhaust valve 28, the running state of the turbocharger 30, and the opening of a throttle valve (not shown).

The following explanation of the present embodiment involves: a "map change control (first control)" for increasing the frequency of direct injection upon a reduction in the fuel injectability of the direct injector 11; "compensation control (second control)" for recovering a shortfall in the injection volume by means of the fuel injection from the port injector upon a reduction in the fuel injectability of the direct injector 11; and "switching control" for switching between the map change control and compensation control in response to the engine load.

In association with these three control operations, the following explanation also involves: an "injection region control" for overall management of the direct injection and port injection; "turbocharge control" for controlling the running state of the turbocharger 30; and "injectability calculation control" for determining a reduction in the fuel injectability of the direct injector 11.

[2. Summary of Control]

[2-1. Injection Region Control]

The injection region control serves to select an appropriate fuel injection mode such as the direct injection and port injection, depending on the operating state of the engine 10 and the output required of the engine 10. The injection region control selects either a port injection mode involving only the port injection or a direct-injection priority mode preferentially involving the direct injection, on the basis of the number Ne of engine revolutions, engine load, air volume, and charging efficiency Ec (e.g., target charging efficiency and actual charging efficiency), for example.

Figure 2A:
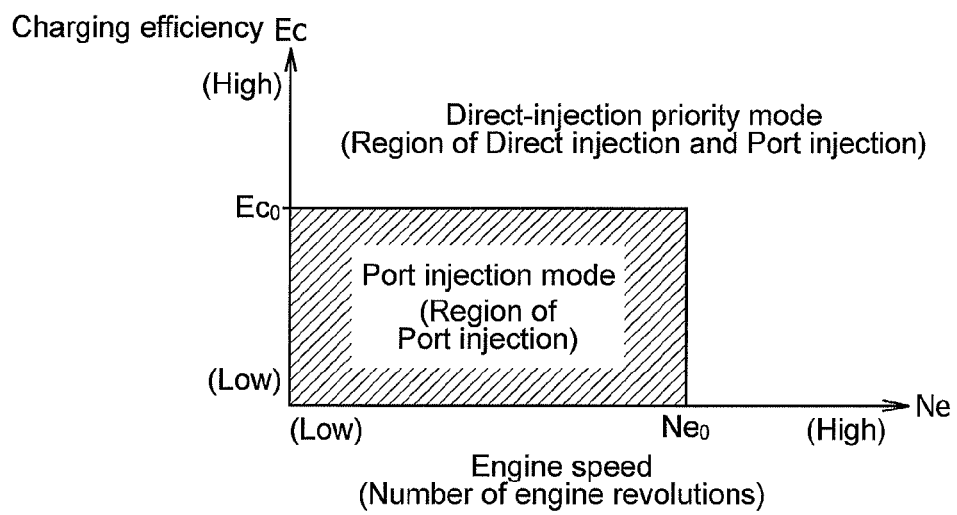
FIGS. 2(a) and 2(b) each are a graph for explaining regions of direct injection and port injection by the control unit.

The selection of a fuel injection mode based on the number Ne of engine revolutions and charging efficiency Ec uses such a control map as illustrated in FIG. 2(a). In specific, if the number Ne of engine revolutions is smaller than a predetermined number $Ne_0$ and if the charging efficiency Ec is lower than a predetermined charging efficiency $Ec_0$, the port injection mode is selected; if the number Ne of engine revolutions is the predetermined number $Ne_0$ or larger, or if the charging efficiency Ec is the predetermined charging efficiency $Ec_0$ or higher, the direct-injection priority mode is selected.

The charging efficiency Ec is the air volume to be charged in the cylinder 20 during a single intake stroke (during which the piston 19 travels from the top dead center to the bottom dead center), the air volume being normalized into a volume under the standard conditions and then being divided by the cylinder capacity. The actual charging efficiency corresponds to the air volume that has entered the cylinder 20 during the stroke, while the target charging efficiency is a desirable value of the charging efficiency Ec and corresponds to the desirable air volume. The selection of a fuel injection mode may use either the actual charging efficiency or the target charging efficiency.

The port injection mode is selected during a low-load low-revolution operating state of the engine 10. The port injection mode inhibits fuel injection from the direct injector 11 and allows the port injector 12 to supply all the fuel necessary to achieve the required output. The fuel volume supplied from the port injector 12 is hereinafter referred to as "port injection volume."

The direct-injection priority mode is selected when the engine 10 is not in a low-load low-revolution operating state (when the port injection mode is inactivated). The direct-injection priority mode prioritizes the direct injection over the port injection. In other words, as long as the direct injector 11 can supply all the fuel necessary for the required output, the direct injector 11 is solely used for fuel injection. The fuel volume supplied from the direct injector 11 is hereinafter referred to as "direct injection volume."

The direct injector 11 however has a maximum injection volume due to the limited injection period and cannot supply more fuel than the maximum volume in a single combustion cycle. Accordingly, if the desirable volume of direct injection exceeds the maximum injection volume of the direct injector 11, the shortfall is recovered by the port injector 12 to ensure the required total fuel injection volume. In this case, the direct injector 11 and port injector 12 are activated in the same combustion cycle for both the direct injection and port injection.

[2-2. Turbocharge Control]

The turbocharge control sets a running state (e.g., on/off state and running intensity) of the turbocharger 30 depending on the operating state of the engine 10 and the output required of the engine 10. The turbocharge control determines whether to run the turbocharger 30 based on the number Ne of engine revolutions and a load on the engine 10, for example, and drives the turbocharger 30 in response to the results of determination.

As a typical method of controlling a turbocharger, the turbocharger 30 is driven when the required load on the engine 10 exceeds a predetermined load. The turbocharge increases intake air to enter the cylinder 20 and increases the engine output.

[2-3. Injectability Calculation Control]

The tip of the direct injector 11 is always exposed to the combustion gas in the cylinder 20, and deposits may be adhered and accumulated around the exit. An increased amount of deposit causes the actual volume of fuel injection from the direct injector 11 to fall below the desirable fuel injection volume designated by the control pulse signals. The injectability calculation control calculates (determines or estimates) such a decline in the fuel injectability of the direct injector 11, and feedbacks the decline to the control command value for the direct injector 11, thereby ensuring the necessary fuel injection volume. The actual volume of fuel injection from the direct injector 11 is calculated based on the oxygen level in the exhaust air detected by the oxygen level sensor 32, for example.

If the fuel injectability of the direct injector 11 decreases, the injectability calculation control adds the volume of the fuel shortfall caused by the capability decline to the desirable volume of fuel injection from the direct injector 11 to ensure the sufficient actual fuel injection volume. The information on the fuel volume added to compensate for the capability decline is stored to be learned for the direct injector 11 provided to each of the cylinders 20. If the desirable fuel injection volume after the compensation for the injectability decline exceeds the maximum injection volume of the direct injector 11, the volume to be compensated for is added to the volume of fuel injection from the port injector 12.

This control operation can maintain the required total fuel injection volume even if the injectability of the direct injector 11 decreases. The decrement in the injectability of the direct injector 11 exceeding a predetermined reference value (the deposits accumulated such that the injectability falls below a reference value) causes either a map change control or compensation control to be performed, as will be explained below.

[2-4. Map Change Control]

The map change control (first control), which is one of the control operations upon a reduction in the injectability of the direct injector 11 calculated under the injectability calculation control, causes the injection region control to more readily select the direct-injection priority mode. The map change control relaxes the conditions required for selecting the direct-injection priority mode such that the injection region control can select the direct-injection priority mode even in an operating state that usually uses the port injection mode.

In the injection region control referring to the control map illustrated in FIG. 2(a), varying the control map can easily vary the conditions for selection. For example, with the control map illustrated in FIG. 2(b), which contains the enlarged region corresponding to the direct-injection priority mode (i.e., the reduced region corresponding to the port injection mode), the injection region control more readily selects the direct-injection priority mode.

The injection region control referring to this control map selects the port injection mode if the number Ne of engine revolutions falls below a predetermined number $Ne_1$ smaller than the predetermined number $Ne_0$ and if the charging efficiency Ec falls below a predetermined efficiency $Ec_1$ lower than the predetermined charging efficiency $Ec_0$. The injection region control selects the direct-injection priority mode if the number Ne of engine revolutions is the predetermined number $Ne_1$ or larger, or if the charging efficiency Ec is the predetermined efficiency $Ec_1$ or higher.

[2-5. Compensation Control]

The compensation control (second control), which is another one of the control operations upon a reduction in the injectability of the direct injector 11 calculated under the injectability calculation control, increases the volume of fuel injection from the port injector 12 to compensate for the decline in the injectability of the direct injector 11. The compensation control adds the volume of the fuel shortfall calculated by the injectability calculation control to the desirable volume of fuel injection from the port injector 12. This control operation can maintain the required total fuel injection volume even if the injectability of the direct injector 11 decreases.

The compensation control contains a "blow-by regulating control," which prevents the fuel supplied by port injection from passing through the cylinder 20 to the exhaust path 29 during the turbocharge operation.

The blow-by regulating control contains three specific modes:

(1) to calculate an increasing rate of the port injection volume to compensate for a decline in the direct injection volume;

(2) to reduce the valve overlap period in response to the increasing rate of the port injection volume; and (3) to delay the port injection timing.

The blow-by regulating control reduces the valve overlap period across an exhaust stroke and an intake stroke, thereby decreasing the volume of air-fuel mixture flowing from the intake port 17 to the exhaust port 18. The volume of blow-by air-fuel mixture further decreases if the valve overlap period reduces in response to the increasing rate of the port injection volume (in response to the decreasing rate of the direct injection volume). Delaying the port injection timing reduces the period from the start of fuel injection to the closure of the exhaust valve 28, thereby further decreasing the blow-by air-fuel mixture.

[2-6. Switching Control]

The switching control switches between the map change control and compensation control depending on a load on the engine 10. The switching control selects either the map change control or compensation control upon a reduction in the injectability of the direct injector 11.

In the present embodiment, the switching control selects the map change control when the turbocharger 30 is not activated, and switches from the map change control to the compensation control upon start of the turbocharge operation. The switching control may refer to another parameter corresponding to the load on the engine 10, such as the air volume or charging efficiency Ec, instead of or in addition to the running state of the turbocharger 30.

[3. Configuration of Control]

The engine control unit 1 for achieving the above control operations includes an injection region controller 2, a turbocharge controller 3, a valve controller 4, an injectability calculator 5, a compensation controller 6, and a switching controller 7 in the form of software or hardware.

The input interface of the engine control unit 1 is connected with the crank angle sensor 31, the oxygen level sensor 32, the fuel pressure sensor 33, the accelerator pedal sensor 34, and the airflow sensor 43, and receives the rotation angle of the crankshaft 21 (or the number Ne of engine revolutions calculated based on the rotation angle), the oxygen level in exhaust air, the fuel pressure, the manipulated variable on pressing on the accelerator pedal, and the volume of intake air, respectively. The output interface of the engine control unit 1 is connected with the direct injector 11, the port injector 12, and the variable valve mechanism 40.

The injection region controller 2 for the injection region control and map change control includes a load detector 2a, a selector 2b, a port injection controller 2c, a direct injection controller 2d, and a map changer 2e.

The load detector 2a detects two loads on the engine 10. A first load serves for the injection region control and selection of a fuel injection mode. For example, the load detector 2a detects the value of the charging efficiency Ec as an index of the load in the example illustrated in FIG. 2(a) or 2(b). The information on the first load is transmitted to the selector 2b.

A second load serves for the map change control and for relaxing the conditions required for selecting the direct-injection priority mode. In the present embodiment, the load detector 2a detects the second load in the form of the running state of the turbocharger 30. The information on the second load is transmitted to the switching controller 7.

The selector 2b selects a fuel injection mode in response to the loads such as the first load detected by the load detector 2a. The selector 2b retains the preset correspondence relationship between the operating state of the engine 10 and the fuel injection mode as illustrated in FIG. 2(a), for example, and selects either the port injection mode involving only the port injection or the direct-injection priority mode preferentially involving the direct injection, based on the number Ne of engine revolutions and charging efficiency Ec (e.g., target charging efficiency and actual charging efficiency). The selector 2b selects the port injection mode during a relatively low-load low-revolution operating state of the engine 10, and selects the direct-injection priority mode during any other operating state (when the port injection mode is inactivated).

The control map stored in the selector 2b is hereinafter referred to as "first control map." The first control map is selected during a relatively low-load operating state of the engine 10. In the present embodiment, the first control map is selected during the non-activated state of the turbocharger 30.

The port injection controller 2c performs the port injection in the port injection mode. In the port injection mode, the port injection controller 2c outputs control pulse signals leading to the port injection to the port injector 12, while inhibiting the direct injector 11 from injecting fuel, so that the port injector 12 supplies all the fuel necessary to achieve the required output. Thus, the port injection controller 2c can control the volume of port injection from the port injector 12.

The direct injection controller 2d performs the direct injection in the direct-injection priority mode, which prioritizes the direct injection over the port injection. In other words, as long as the direct injector 11 can supply all the fuel necessary for the required output, the direct injection controller 2d outputs control pulse signals to the direct injector 11. The magnitude of the control pulse signals (driving pulse width) is set to correspond to the desirable volume of direct injection calculated based on the number Ne of engine revolutions and charging efficiency Ec.

The desirable volume of direct injection however has an upper limit due to the maximum injection volume of the direct injector 11. The magnitude of the control pulse signals output to the port injector 12 is set to correspond to a volume calculated by subtracting the maximum injection volume of the direct injector 11 from the desirable volume of direct injection.

If the desirable volume of direct injection from the direct injector 11 is equal to or smaller than the maximum injection volume thereof, the control pulse signals for the port injector 12 are not output. Such settings of control pulse signals lead to preferential driving of the direct injector 11.

Figure 2B:
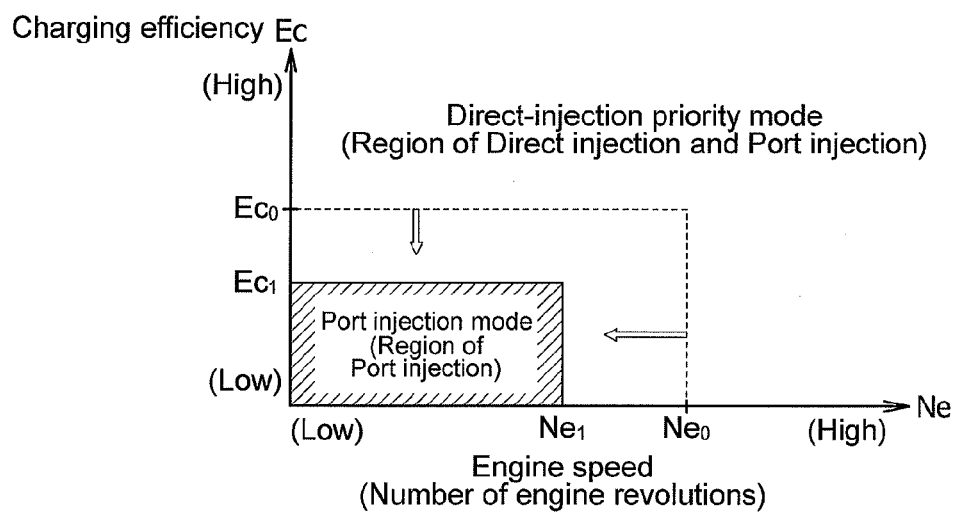

The map changer 2e (first controller) for the map change control retains the preset correspondence relationship between the operating state of the engine 10 and the fuel injection mode as illustrated in FIG. 2(b), for example. If the decrement in the injectability of the direct injector 11 exceeds a reference value, the map changer 2e causes the selector 2b to refer to this control map, thereby increasing the frequency of the direct injection. The switching controller 7 described below finally determines execution of the map change control.

The control map stored in the map changer 2e is hereinafter referred to as "second control map." The second control map is selected during a relatively high-load operating state of the engine 10. In the present embodiment, the second control map is selected during the activated state of the turbocharger 30.

The turbocharge controller 3 (turbocharge detector) for the turbocharge control determines the number Ne of engine revolutions and the magnitude of load on the engine 10, and outputs control signals for driving the turbocharger 30 if the current operating state needs turbocharge.

The load magnitude may be calculated based on the manipulated variable on pressing on the accelerator pedal, the opening of the throttle valve, or the air volume (e.g., desirable intake volume, target charging efficiency, actual intake volume, and actual charging efficiency). The conditions required for turbocharge may be independent from the conditions required for selecting a fuel injection mode, or may be defined as a certain region of the graph of FIG. 2(a) or 2(b).

The valve controller 4 (overlap period controller) for controlling operations of the variable valve mechanism 40 determines the control angle $\theta_{VVL}$ and phase angle $\theta_{VVT}$ of each of the intake valve 27 and exhaust valve 28 in response to parameters such as the operating state of the engine 10, the number Ne of engine revolutions, and the engine load. The information on the control angles $\theta_{VVL}$ and phase angles $\theta_{VVT}$ is transmitted from the valve controller 4 to the valve lift adjusters 41 and valve timing adjusters 42 of the variable valve mechanism 40.

The injectability calculator 5 (injection volume calculator) for injectability calculation control includes an actual direct-injection volume calculator 5a, a learner 5b, and a corrector 5c.

The actual direct-injection volume calculator 5a calculates an actual volume of direct injection based on the oxygen level in exhaust air detected by the oxygen level sensor 32. The actual direct-injection volume calculator 5a calculates the amount of oxygen consumed by the combustion on the basis of a difference between the oxygen level in exhaust air and the external oxygen level, and calculates the consumed fuel volume corresponding to the amount of consumed oxygen.

In parallel execution of the direct injection and port injection, the actual volume of the direct injection from the direct injector 11 is calculated by subtracting the volume of fuel of the port injection from the calculated volume of the consumed fuel. In sole execution of the direct injection, the actual volume of the direct injection is equal to the calculated volume of the consumed fuel. The calculated actual volume of direct injection is transmitted to the learner 5b.

The learner 5b calculates a decrement in the actual volume of direct injection calculated by the actual direct-injection volume calculator 5a relative to the desirable volume of direct injection, which is corresponding to the control pulse signals output from the injection region controller 2. The learner 5b calculates a shortfall in the direct injection volume and a decrement in the injectability for the direct injector 11 provided to each of the cylinders 20. The decrement in the injectability can be comprehended, for example, by calculating the rate of the actual volume of direct injection to the desirable volume of direct injection. The decrement can be comprehended by calculating the amount of deposit calculated based on the shortfall in the direct injection volume. The shortfall in the direct injection volume is transmitted to the corrector 5c, while the decrement in the injectability is stored in a storage memory in the learner 5b.

The corrector 5c allows the injection region controller 2 to output the control pulse signals after compensation for the shortfall in the direct injection volume. The corrector 5c outputs control signals for adding the shortfall in the direct injection volume to the direct injection volume from the direct injector 11 calculated by the injection region controller 2. Thus, if the learner 5b detects an injectability decline in the direct injector 11, the direct injection volume in the subsequent injections is corrected to increase. If the corrected volume of the direct injection from the direct injector 11 exceeds the maximum injection volume thereof, the port injection volume is corrected to increase.

The compensation controller 6 (second controller) is in charge of the compensation control and blow-by regulating control. The compensation controller 6 performs the compensation control if the decrement in the injectability of the direct injector 11 calculated by the learner 5b exceeds a reference value (if the deposits are so accumulated that the injectability falls below a reference value), to add the fuel shortfall to the desirable volume of fuel injection from the port injector 12. The compensation controller 6 performs the above-described three modes of the blow-by regulating control to prevent the fuel of port injection increased by the compensation control from flowing to the exhaust path 29.

For the three individual control modes, the compensation controller 6 includes a port-injection increasing-rate calculator 6a, a valve overlap changer 6b, and a port-injection timing changer 6c.

The port-injection increasing-rate calculator 6a calculates an increasing rate of the volume of the port injection from the port injector 12. If the compensation control causes the port injection volume to increase, the increasing rate is equal to the rate of the increment to the port injection volume before the correction. The information on the increasing rate is transmitted to the valve overlap changer 6b.

The valve overlap changer 6b reduces the period of valve overlap (VOL) in response to the increasing rate of the port injection volume. The decrement in the valve overlap period is determined in response to the increasing rate calculated by the port-injection increasing-rate calculator 6a and the number Ne of engine revolutions. The "VOL Limitation Map" in Table 1 below shows an example of the determined decrements. According to the example, as the increasing rate of the port injection volume increases or as the number Ne of engine revolutions decreases, the decrement in the valve overlap period increases (the valve overlap period decreases).

TABLE 1

VOL LIMITATION MAP (DECREMENT IN VOL RELATIVE TO SET VALUE)

|  | | NUMBER OF ENGINE REVOLUTIONS [rpm] | | | |
| --- | --- | --- | --- | --- | --- |
|  |  | 1000 | 2000 | 3000 | ... |
| INCREASING RATE OF PORT INJECTION VOLUME [%] | 5 | 15[° CA] | 10[° CA] | 5[° CA] | ... |
|  | 10 | 20[° CA] | 15[° CA] | 10[° CA] | ... |
|  | 15 | 25[° CA] | 20[° CA] | 15[° CA] | ... |
|  | ... | ... | ... | ... | ... |

The port-injection timing changer 6c delays the timing of fuel injection from the port injector 12. The lag (retarded time, retarded angle) for the port injection timing is determined in response to the number Ne of engine revolutions. The "Port Injection Timing Map" in Table 2 below shows an example of the determined lags. According to the example, as the number Ne of engine revolutions decreases, the start of the port injection lags (start time of the port injection is delays). The figures in the table each indicate what degree the crank angle upon start of the port injection lags relative to the reference angle (0[°CA]) at the top dead center after a compression stroke. ("BTDC" represents "Before the Top Dead Center".)

TABLE 2

PORT INJECTION TIMING MAP
NUMBER OF ENGINE REVOLUTIONS [rpm]

| 1000 | 2000 | 3000 | ... |
|---|---|---|---|
| 450[° CA, BTDC] | 500[° CA, BTDC] | 545[° CA, BTDC] | ... |

The switching controller 7 for the switching control switches between the map change control and compensation control depending on a load on the engine 10. The switching controller 7 selects either the map change control or compensation control on the basis of the second load detected by the load detector 2a.

During the non-activated state of the turbocharger 30, the switching controller 7 selects the map change control, assuming a low load, and outputs signals causing the map change control to the map changer 2e. During the activated state of the turbocharger 30, the switching controller 7 selects the compensation control, assuming a high load, and outputs signals causing the compensation control and blow-by regulating control to the compensation controller 6. Thus, for a decrement in the injectability of the direct injector 11 exceeding a reference value, the switching controller 7 switches from the map change control to the compensation and blow-by regulating controls and vice versa, in response to the running state of the turbocharger

[4. Flowchart]

[4-1. Normal Control]

Figure 3:
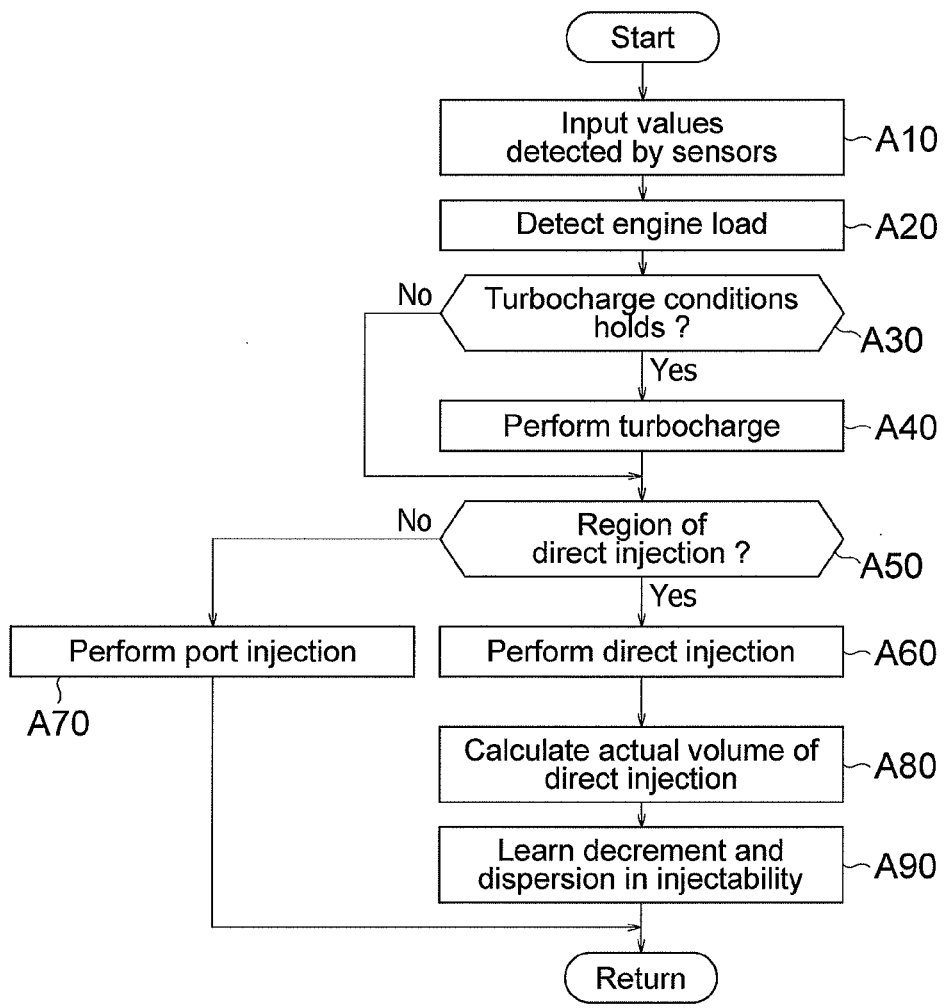
FIG. 3 is a flowchart illustrating control operations by the control unit over calculation for the injectability of a direct injector.

FIG. 3 is a flowchart illustrating the injection region control, the turbocharge control, and the injectability calculation control among the control operations in the engine control unit 1. This process is repeated in a predetermined cycle in the engine control unit 1.

In Step A10, the engine control unit 1 receives input information on the values detected by the sensors, such as the oxygen level in exhaust air, the number Ne of engine revolutions, and the manipulated variable on pressing on the accelerator pedal. In Step A20, the load detector 2a detects a load on the engine 10. For example, the target charging efficiency of the engine 10 is calculated based on parameters such as the number Ne of engine revolutions and the manipulated variable on pressing on the accelerator pedal.

In Step A30, the turbocharge controller 3 determines whether the current operating state needs turbocharge on the basis of the load, on the engine 10 detected in Step A20. If the conditions required for turbocharge hold, the process goes to Step A40, in which the turbocharge controller 3 outputs control signals for driving the turbocharger 30, and then goes to Step A50. If the conditions required for turbocharge do not hold, the process jumps to Step A50.

In Step A50, the selector 2b selects a fuel injection mode on the basis of the parameters such as the load etc., on the engine 10 detected in Step A20, and determines the type of the current mode. If the port injection mode is selected, the process goes to Step A70, in which the port injection controller 2c outputs control pulse signals to the port injector 12 to perform port injection. If the direct-injection priority mode is selected in Step A50, the process goes to Step A60.

In Step A60, the direct injection controller 2d outputs control pulse signals to the direct injector 11 to perform direct injection. If the desirable fuel injection volume exceeds the maximum injection volume of the direct injector 11, the port injection is performed in parallel.

In Step A80, the actual direct-injection volume calculator 5a calculates the consumed fuel volume based on the oxygen level in exhaust air, and calculates the actual volume of direct injection from the direct injector 11. In Step A90, the learner 5b calculates the decrement in the actual volume of direct injection relative to the desirable volume of direct injection, and calculates the shortfall in the direct injection volume. The calculated decrement in the injectability is stored to be learned by the storage memory in the learner 5b for the direct injector 11 provided to each of the cylinders 20. The learning contributes to the direct injection in the subsequent calculation periods.

Unless the accumulation of the deposits causes the injectability of the direct injector 11 to fall below a reference value, the engine control unit 1 repeats the injection region control, the turbocharge control, and the injectability calculation control.

[4-2. Control Upon Reduction in Direct Injection Volume]

Figure 4:
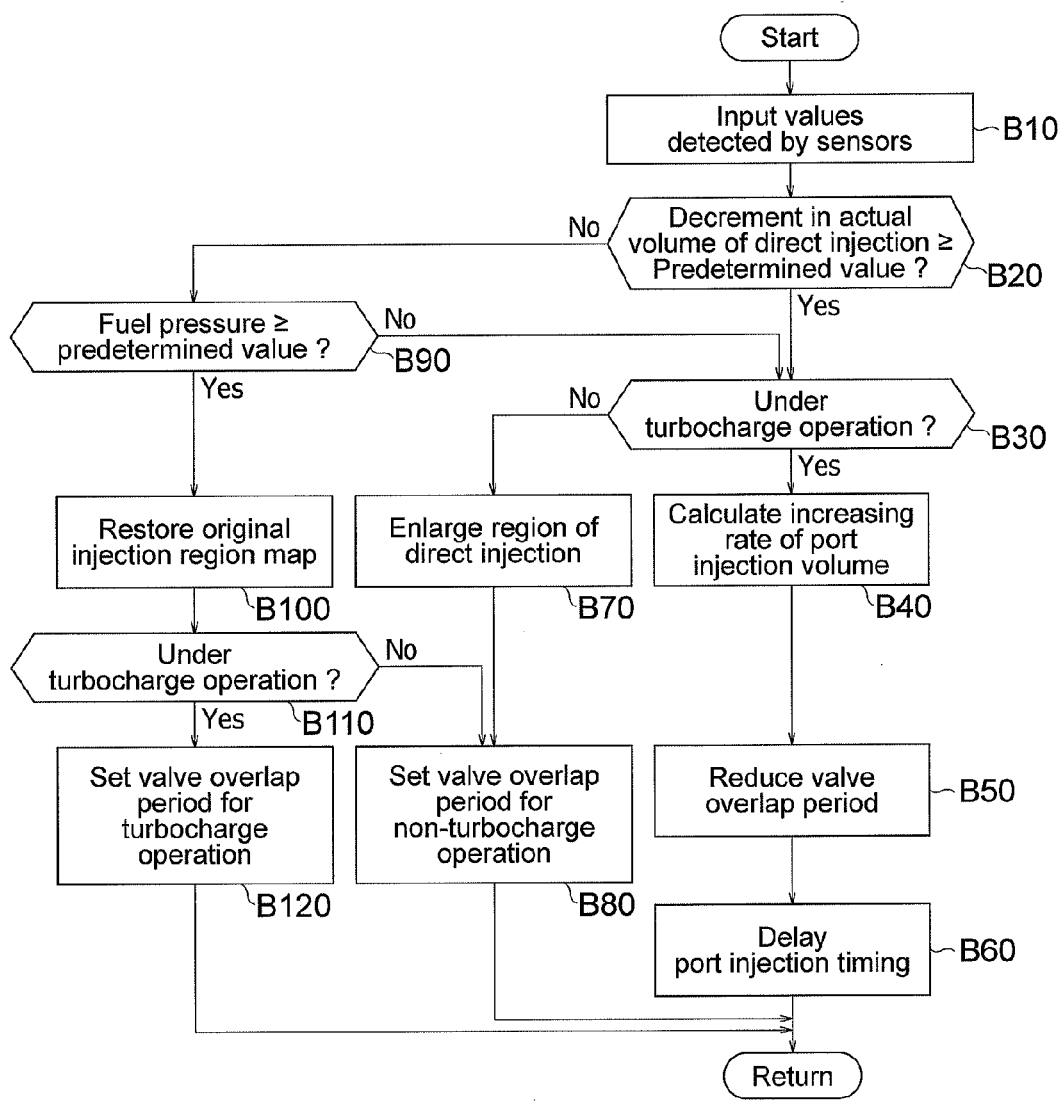
FIG. 4 is a flowchart illustrating the steps of switching between control operations by the control unit.

The flowchart of FIG. 4 relates to the map change control, the compensation control, and the switching control among the control operations in the engine control unit 1. This process is repeated in a predetermined cycle in parallel with the process illustrated in FIG. 3.

In Step B10, the engine control unit 1 receives input information, such as the pressure of fuel to enter the direct injector 11, the type of the current injection mode, the decrement in the injectability of the direct injector 11 calculated by the learner 5b, and the running state of the turbocharger 30.

In Step B20, the map changer 2e and the compensation controller 6 each determine whether the decrement in the injectability of the direct injector 11 exceeds a reference value. For an engine 10 including multiple cylinders, the dispersion in the volumes of fuel injection from the individual direct injectors 11 of the cylinders 20 may be determined in this step. For example, whether the deviation of the decrement for each of the direct injectors 11 exceeds a predetermined value may be determined.

If the condition in Step B20 holds, it is determined that the accumulation of the deposits causes the injectability of the direct injector 11 to fall below a reference value, and then the process goes to Step B30. If the condition in Step B20 does not hold, the process goes to Step B90.

In Step B90, whether the pressure of fuel to enter the direct injector 11 exceeds a predetermined value is determined. The injectability decline in the direct injector 11 may be caused by, for example, any trouble in the high-pressure fuel path 13A or the high-pressure pump 14A. In this Step, the determination on the normality of the fuel pressure leads to no injectability decline caused by troubles in the fuel injection system.

If the fuel pressure is the predetermined value or higher, which means that the injectability of the direct injector 11 has not significantly deteriorated, the process goes to Step B100. If the fuel pressure is lower than the predetermined value, the process goes to Step B30.

In Step B30, the switching controller 7 determines whether the turbocharger 30 is activated (turbocharge operation is performed). If the turbocharge operation is performed, the switching controller 7 selects the compensation control and blow-by regulating control, and the process goes to Step B40. If the turbocharge operation is not performed, the switching controller 7 selects the map change control, and the process goes to Step B70.

In Step B40, the port-injection increasing-rate calculator 6a of the compensation controller 6 calculates an increasing rate of the volume of port injection from the port injector 12. For example, the port-injection increasing-rate calculator 6a calculates an increment in the port injection volume based on the decrement in the actual volume of direct injection and the fuel pressure, and calculates the increasing rate in the form of the rate of the increment to the port injection volume before the correction.

In Step B50, the valve overlap changer 6b determines a decrement in the valve overlap period based on the increasing rate of the port injection volume and the number Ne of engine revolutions. As the increasing rate of the port injection volume increases or as the number Ne of engine revolutions decreases, the valve overlap period decreases. The decrement in the valve overlap period is transmitted to the valve controller 4, which controls the phase angles $\theta_{VVT}$ of the intake valve 27 and exhaust valve 28 in response to the decrement. The phase angles $\theta_{VVT}$ may be controlled by any specific technique. For example, the opening of the intake valve 27 may lag (the opening time may be retarded), or the closure of the exhaust valve 28 may advance (the closing time may be advanced).

In Step B60, the port-injection timing changer 6c determines the timing of start of the port injection based on the number Ne of engine revolutions. As the number Ne of engine revolutions decreases, the start timing of the port injection lags.

If the process goes from Step B30 to Step B70, the map changer 2e varies the control map on the setting of fuel injection modes to increase the frequency of the direct injection. Thus, the control map referred to by the selector 2b in Step A50 in the flowchart of FIG. 3 is switched from the first control map in FIG. 2 (a) to the second control map in FIG. 2 (b), for example, so that the selector 2b more readily selects the direct-injection priority mode. The process goes to Step B80 to set the valve overlap period for non-turbocharge operation and to be terminated. In this case, the normal valve overlap setting is adopted under the presumption that the non-turbocharge operation does not cause blow-by of fuel.

In Step B100, following the determination that the fuel pressure is the predetermined value or higher in Step B90, the map changer 2e restores the original control map on the setting of fuel injection modes. For example, the control map referred to by the selector 2b in Step A50 in the flowchart of FIG. 3 is switched from the second control map in FIG. 2 (b) to the first control map in FIG. 2 (a). If the control map on the setting of fuel injection modes was not switched to the second control map, the first control map continues to apply.

In Step B110, the switching controller 7 determines whether the turbocharger 30 is activated (turbocharge operation is performed) as in Step B30. While the determination in Step B30 needs a significant reduction in the actual volume of direct injection, the turbocharge state without a significant reduction in the actual volume of direct injection is determined in Step B110. If the turbocharge operation is performed, the process goes to Step B120 to set the normal valve overlap period for turbocharge operation and to be terminated. If the turbocharge operation is not performed, the process goes to Step B80 to set the valve overlap period for non-turbocharge operation and to be terminated.

[5. Operations and Advantageous Effects]

The above-described embodiments can provide the following operations and advantageous effects:

(1) The map change control among the control operations in the engine control unit 1 promotes the removal of the deposits accumulated around the exit of the direct injector 11 to promote the restoration of the direct injection volume. The compensation control, which increases the volume of port injection from the port injector 12 instead of the direct injector 11, compensates for the decrement in the direct injection volume to maintain the output of the engine 10.

The switching between the map change control and compensation control depending on a load on the engine 10 can balance the parallel operations of the control for restoring the injectability of the direct injector 11 and the control for preferentially maintaining the output of the engine 10. This control operation can keep the injectability of the direct injector 11 higher than that of conventional techniques, while achieving the required output.

(2) The engine control unit 1 performs the map change control in a relatively low-load operating state, and performs the compensation control in a high-load operating state. Applying the control for restoring the direct injection volume to only a low-load operating state leads to the removal of the deposits along with the maintenance of the output of the engine 10. In a high-load operating state, this control operation prioritizes the maintenance of the output over the restoration of the injectability, thereby achieving high output.

(3) The engine control unit 1 switches between the map change control and the compensation control depending on the running state of the turbocharger 30. This leads to restoration of the injectability of the direct injector 11 in non-turbocharge operation, which does not require high output. In a turbocharge operation, which requires high output, this control operation temporality stops removing the deposits to maintain the output of the engine 10.

(4) The map change control by the engine control unit 1, which promotes the selection of the direct-injection priority mode, can enlarge the operation region for fuel supply from the direct injector 11, thereby frequently restoring the injectability of the direct injector 11. This control operation prevents accumulation of deposits around the exit of the direct injector 11.

(5) In the map change control, the selector 2b selects a fuel injection mode on the basis of the number Ne of engine revolutions and charging efficiency Ec. This control operation leads to accurate determination of the current operating state of the engine 10 and magnitude of a load required of the engine 10, thereby ensuring an appropriate engine output.

(6) The engine control unit 1 increases the port injection volume equivalent to the decrement in the direct injection volume under the compensation control, thereby achieving the constant total fuel injection volume and maintaining the engine output. The engine control unit 1 also reduces the valve overlap period to prevent the blow-by caused by the increased port injection volume. The engine 10 can therefore efficiently operate while maintaining both the engine output and environment performance.

(7) As the port injection volume increases, the engine control unit 1 reduces the valve overlap period, as illustrated in Table 1. In other words, the decrement in the valve overlap period reflects the increasing rate of the port injection volume. This control operation can enhance the effect of regulating the blow-by of fuel.

(8) As the number Ne of engine revolutions decreases, the engine control unit 1 reduces the valve overlap period, as illustrated in Table 1. In other words, as the actual time of valve overlap increases, the valve overlap period decreases. This control operation can further enhance the effect of regulating the blow-by of fuel.

(9) As the number Ne of engine revolutions decreases, the engine control unit 1 delays the port injection timing such that the lag in the opening of the port injector increases, as illustrated in Table 2. In other words, as the actual time from the start of fuel injection into the intake port 17 to the closure of the exhaust valve 28 increases in a lower-revolution operating state, the opening of the port injector lags. This control operation can further enhance the effect of regulating the blow-by of fuel.

(10) In the calculation for the injectability of the direct injector 11, the engine control unit 1 calculates a decrement in the actual volume of direct injection relative to the desirable volume of direct injection. The reference to the decrement in the actual injection volume relative to the control command value can eliminate the effect of calculation errors in the engine control unit 1. This control operation leads to accurate determination of the injectability decline.

(11) The engine control unit 1 calculates the actual volume of direct injection based on the oxygen level in exhaust air, thereby accurately calculating the amount of oxygen consumed by the combustion. This control operation can improve the accuracy of calculation for the actual volume of direct injection from the direct injector 11.

(12) The engine control unit 1 performs the blow-by regulating control regardless of a small amount of accumulated deposit under a fuel pressure lower than a predetermined value. The reference to the fuel pressure leads to specifying the cause of decline in the direct injection volume, for example, determining whether the cause is the accumulation of deposits on the direct injector 11 or any trouble in the fuel injection system. This control operation leads to accurate detection of the decline in the direct injection volume.

[6. Modifications]

The above-described embodiments may be modified without departing from the gist. The individual features of the embodiments may be selectively employed as necessary or properly combined with one another.

Although the above explanation illustrates the switching between the map change control and compensation control determined by the switching controller 7 depending on the second load (running state of the turbocharger 30) detected by the load detector 2a, the switching may be determined under any other specific condition. For example, the switching controller 7 may select the map change control if the air volume or charging efficiency Ec is lower than a predetermined value, and switch to the compensation control when the parameter reaches the predetermined value or higher. Switching between the control operations depending on a parameter corresponding to the load on the engine 10 can provide the same effects as those of the above-described embodiments.

Although the above explanation illustrates that the blow-by regulating control starts if the injectability decline in the direct injector 11 determined by the injectability calculation control exceeds a reference value during the running of the turbocharger 30 under the turbocharge control, the blow-by regulating control may start under any other specific condition. The blow-by regulating control may apply as long as the current operating state readily causes blow-by of fuel of port injection.

Although the above explanation illustrates the present invention applied to the multi-cylinder gasoline engine 10, the engine 10 may include any number of cylinders and employ any combustion system.

REFERENCE SIGNS LIST

1 engine control unit
2 injection region controller
2a load detector
2b selector
2c port injection controller
2d direct injection controller
2e map changer (first controller)
3 turbocharge controller (turbocharge detector)
4 valve controller (overlap period controller)
5 injectability calculator (injection volume calculator)
6 compensation controller (second controller)
7 switching controller
11 direct injector (cylinder injection valve)
12 port injector (port injection valve)

The invention claimed is:

1. A control unit for an internal combustion engine, the engine comprising a direct injector directly injecting fuel into a cylinder and a port injector injecting fuel into an intake port of the cylinder, the control unit comprising:
   a load detector to detect a load on the engine;
   an injection volume calculator to calculate a direct injection volume indicating a volume of the fuel injected from the direct injector;
   a first controller to perform a first control for increasing the frequency of the injection by the direct injector, upon a reduction in the cylinder injection volume;
   a second controller to perform a second control for increasing a port injection volume indicating a volume of the fuel injected from the port injector, upon a reduction in the cylinder injection volume; and
   a switching controller to switch between the first control with the first controller and the second control with the second controller depending on the load.

2. The control unit according to claim 1, wherein the switching controller causes the first controller to perform the first control if the load is lower than a predetermined load, and causes the second controller to perform the second control if the load is not lower than the predetermined load.

3. The control unit according to claim 2, further comprising a turbocharge detector to detect a running state of a turbocharger provided in the engine, wherein
   the switching controller causes the first controller to perform the first control if the turbocharger is not activated, and causes the second controller to perform the second control if the turbocharger is activated.

4. The control unit according to claim 3, further comprising a selector to select a first operation region for fuel supply from the direct injector or a second operation region for fuel supply from the port injector, depending on the load, wherein
   the first control increases the frequency of selection of the first operation region by the selector, upon a reduction in the cylinder injection volume.

5. The control unit according to claim 4, wherein
   the load detector detects the load in the form of a volume of air to enter the engine and the number of revolutions of the engine,
   the selector selects the first operation region or the second operation region based on the air volume and the number of revolutions, and the first controller decreases a threshold value of each of the air volume and the number of revolutions for selection of the first operation region, upon a reduction in the cylinder injection volume.

6. The control unit according to claim 1, further comprising:
   a port injection controller to control the port injection volume; and
   an overlap period controller to control an overlap period during which both an intake valve and an exhaust valve of the cylinder are open, wherein
   the second control increases the port injection volume equivalent to a decrement in the cylinder injection volume and reduces the overlap period, upon a reduction in the cylinder injection volume.

* * * * *